US005801380A

United States Patent [19]
Sinha

[11] Patent Number: 5,801,380

[45] Date of Patent: Sep. 1, 1998

[54] ARRAY DETECTORS FOR SIMULTANEOUS MEASUREMENT OF IONS IN MASS SPECTROMETRY

[75] Inventor: Mahadeva P. Sinha, Temple, Calif.

[73] Assignee: California Institute of Technology, Pasadena, Calif.

[21] Appl. No.: 600,861

[22] Filed: Feb. 9, 1996

[51] Int. Cl.[6] .............................. H01J 49/00; B01D 59/44

[52] U.S. Cl. ........................... 250/299; 250/282; 250/283

[58] Field of Search ..................................... 250/281, 299, 250/300, 283, 282; 313/103 CM, 105 CM

[56] References Cited

U.S. PATENT DOCUMENTS

| | | | |
|---|---|---|---|
| 3,868,507 | 2/1975 | Panitz | 250/287 |
| 3,955,084 | 5/1976 | Giffin | 250/281 |
| 4,785,172 | 11/1988 | Kubena et al. | 250/288 |
| 5,463,218 | 10/1995 | Holle | 250/283 |
| 5,528,099 | 6/1996 | Xie | 313/309 |

*Primary Examiner*—Bruce Anderson
*Attorney, Agent, or Firm*—Fish & Richardson P.C.

[57] ABSTRACT

Improvements for viewing particles, e.g. electrons or ions, in mass spectrometer systems. A special kind of system allows a phosphor to be formed which does not include any kind of conductive layer thereon. The particles impinge directly on the phosphor, and produce light that shines through an ITO layer. This special system enables lower voltage, and smaller systems. Another improvement enables direct viewing of ions from the system.

29 Claims, 4 Drawing Sheets

ARRAY DETECTORS FOR SIMULTANEOUS MEASUREMENT OF IONS IN MASS SPECTROMETRY

BACKGROUND OF THE INVENTION

The present invention makes improvements in charged particle detection. More specifically, the present invention teaches improvements in signal detection, and in other components of systems for measurement of chemical characteristics of materials. Such systems include mass spectrometers and gas chromatographs.

SUMMARY OF THE INVENTION

Many applications require ascertaining the chemical composition of a sample. Various devices have been used in the prior art for this purpose. A combination of a gas chromatograph ("GC") and a mass spectrometer ("MS") is the most powerful method for this purpose.

A gas chromatograph separates a mixed sample of different materials into its different constituent parts. The output of the gas chromatograph can feed a mass spectrometer. The components of the mixture sample are separated by the GC and each separated constituent part from the GC arrives at the MS. The MS analyzes the separated components of the material and determines their mass spectra. The mass spectra are characteristics of the compounds, and are used to determine their chemical nature.

A mass spectrometer operates by ionizing a gaseous/vapor sample of material FIG. 1 shows sample vapor being introduced into the ionization source 112 either directly or through a gas chromatograph 110 (for a complex mixture). The ion source is maintained under vacuum at a pressure of ~$10^{-5}$ torr with a vacuum pump. The sample molecules are bombarded with a beam of electrons in the ionization source. The process results in the production of ions of various masses depending on the chemical nature of the sample molecules. The ions are then separated according to their masses (charge to mass ratios) by the application of electric and/or magnetic fields. Intensities of different mass ions are measured by using a detector system 116.

Mass Spectrometers can be of a scanning-type or of a nonscanning-type (focal plane type). In a scanning-type MS, different mass ions are separated in time and their intensities are measured successively by a single element detector. The ions of all the other masses are discarded while the intensity of one mass is measured. A focal plane type MS, in contrast, spatially separates the ions of different masses. The intensities of these spatially separated ions are measured simultaneously with a photographic plate or an array detector, having multiple elements, of high sensitivity and spatial resolution.

A block diagram of the scanning type mass spectrometer is shown in FIG. 2. The quadrupole mass spectrometer shown in the figure is a typical example of this type of MS. Ions are produced from an ion source 200 and the output ions enter a tuned cavity 202. Cavity 202 is tuned to allow only a single mass ion 204 to pass; all the other untuned ion masses 206 are discarded in order to resolve the tuned mass ions from them. The tuning of the cavity is scanned over time. This means that different ion masses are successively allowed to pass at different times. At any given time, therefore, only a single ion mass will hit the detector 210 e.g., an electron multiplier. The intensity of the ions measured by the detector, therefore, indicates the amount of ions of that mass in the sample.

Scanning over the whole mass spectrum enables determination of a plot of mass vs intensity. Each particular material has a unique combination of different masses and their intensity. The combination is called a mass spectrum 118. Hence the scanning plot (mass spectrum) provides the chemical nature of the material.

Scanning-type devices de-tune most of the ions at any given time. Hence, most of the signal generated from a sample is deliberately lost prior to detection. These devices have limited scan rate and possess relatively low sensitivity.

The focal plane type of mass spectrometer spectrally analyzes all masses of the sample at once. The mass spectrometers based on Mattauch-Herzog ("M-H") geometry or Dempster geometry are examples of this type of MS. FIG. 3 shows a M-H design schematically. An applied electric field in the electrostatic sector 302 and a magnetic field in the magnetic sector 303 are used to spatially separate the different mass ions. Each ion mass is directed to a different location 304, 306 along the focal plane. An array of detectors with high spatial resolution is placed along the focal plane to measure the intensities of all the ions simultaneously. Signals from different detector elements provide the intensities of different mass ions. The individual detector elements of the array detector for this focal plane geometry need to be small so that signal measurements with spatial resolutions of 10–30 microns can be accomplished. Multiple detector elements cover the region of each mass-ions and thus, the intensity/peak profile of each mass is obtained from the detector output.

Both types of mass spectrometers measure a characteristic spectrum of intensity versus mass. As described above, this spectrum can be used to identify the compound.

FIG. 4 shows the array detector device that is used for the ion measurements. A microchannel plate has been used to amplify the intensity of the arriving ion species. Each of the channels is typically separated by 10 to 25 microns center-to-center. The ions strike a channel of the plate generating electrons. The electrons bounce back and forth, each time striking the channel walls, and generating yet another electron. This system is repeated to produce a thousand-fold gain. This system is descriptively called an electron multiplier.

The electrons that are output from the plate impinge on an imaging system which allows viewing the images of the electrons. The imaging device has a phosphor layer deposited on a fiber optic plate. A thin aluminum layer has been deposited on the top of the phosphor which provides an electrically conductive layer on the phosphor. The electrons strike the phosphor after penetrating through the aluminum layer. The electrons striking the phosphor excite phosphorescence in the phosphor. The photons can be seen or measured with a CCD, photodiode array or active pixel sensor type device. These sensors measure the photon images of the different mass-ions simultaneously.

This Focal Plane type system enables much more efficient use of the signal generated from the analytical sample. The system has a 100% duty cycle and orders of magnitude greater sensitivity/detectivity than the scanning type system which discards most of the ion information. However, those having ordinary skill in the art have recognized a number of problems in this system.

FIG. 5 shows the output area of the system which forms the focal plane. The exiting ions are traveling substantially in the direction of axis 500 when they exit magnetic sector 303. Since these ions are relatively heavy, their trajectories are not usually affected significantly by the fringe magnetic field 505. The fringe field arises from the magnetic field of the analyzer, since the magnetic field cannot be abruptly terminated at the exit 510 of the magnet. The electrons exiting the back of the MCP channels are also subjected to this fringe field.

FIG. 5 shows the curved lines of force of the fringe magnetic field 505. These curved lines of force modify the electron trajectories because of low electron mass and consequently, the electrons follow the modified trajectories. These lines of force effectively reverse the direction of electron motion. The inventor recognized that this turning of electrons causes problems in the generation of photon images of the ions. There were additional problems associated with the phosphor display system.

Phosphors are natural insulators. It has been known for years that electrons impinging a phosphor plate would accumulate charge on the phosphor plate. The accumulated charge on the Phosphor Plate would repel the incoming electrons. Since the incoming electrons would be repelled, they would never reach the phosphor plate, and hence never be displayed. The thin conducting layer of aluminum described above was placed on the phosphor plate to avoid the charge accumulation phenomenon.

However, in order for the electrons to be displayed, they must have sufficient energy to pass through this conductive layer. Electrons had to be accelerated to a high energy so that they could penetrate through the Al layer and excite phosphorescence. This was accomplished by applying a high voltage (4–10 kV) between the back of the MCP and the phosphor plate. The application of high voltage necessitated that the phosphor plate be separated from the MCP at the electron output by 1–2 mm in order to avoid an electrical breakdown due to high electric field in this region.

This spacing, however, has allowed enough space for the fringe field to reverse the direction of the electrons. One problem in the prior art, therefore, has been the fringe field turning the electrons in a way such that they do not hit the Phosphor.

The problems in the previous art were responded to in various ways.

FIG. 6 shows a first solution. The electron detector 600 has an input face 602 along plane 604. Plane 604 is tilted relative to the focal plane 610—i.e., is not parallel therewith. Another solution is also shown in FIG. 6. This uses a magnet extension and shim 620. This modification of the pole pieces of the magnetic sector effectively modify the directions of the magnetic field between the back of the MCP 630 and the phosphor plate 640. The modified magnetic flux for this fringe field region is shown in FIG. 6. These changes enable the electrons to strike the phosphor layer.

However, these modifications have resulted in a complex design of the detector system and the mass analyzer. These have also added to the high cost of the detector system. More importantly, the inventors recognized that the above arrangement has deteriorated the performance of the mass spectrometer because of the dislocation of the detector system away from the focal plane and distortion of the focal plane itself. For the best performance/resolution of the instrument, the inventors recognized that the front of the MCP needs to be located at the focal plane in a manner that the focal plane and the MCP plane are parallel to each other.

BRIEF DESCRIPTION OF THE DRAWINGS

These and other aspects of the invention will now be described in detail with reference to the accompanying drawings, wherein.

DESCRIPTION OF THE PREFERRED EMBODIMENTS

The inventor of the present invention has defined new and unobvious structure and techniques which avoid these problems in a new and completely unobvious way. In addition, the techniques of the present invention enable new applications which have never previously been possible in the prior art.

Electrons travel in a curved trajectory under influence of the fringe field. The radius R of the curvature of an electron trajectory in a magnetic field is defined by the equation $$R = \frac{K}{B} \sqrt{M_e V_e}$$

Where B is the magnitude of the magnetic field, $M_e$ is the mass of the electron and $V_e$ is the energy (volts) of the electron. Since K, Me are constants, R α $\sqrt{M_e}$ for a given magnetic field B.

The inventors recognized that significant advantages can be obtained by bringing the phosphor plate closer to the output. If the separation between the electron output and the phosphor plate is made to be less than R, the travelling electron could not return to the source, and no other compensating techniques, e.g., tilting the plate or redirecting the lines of forces in the fringe field region by adding shims to the magnetic sector analyzer, would need to be done. These measures could of course be added as extra compensation, but would not need to be done.

Figure 1:
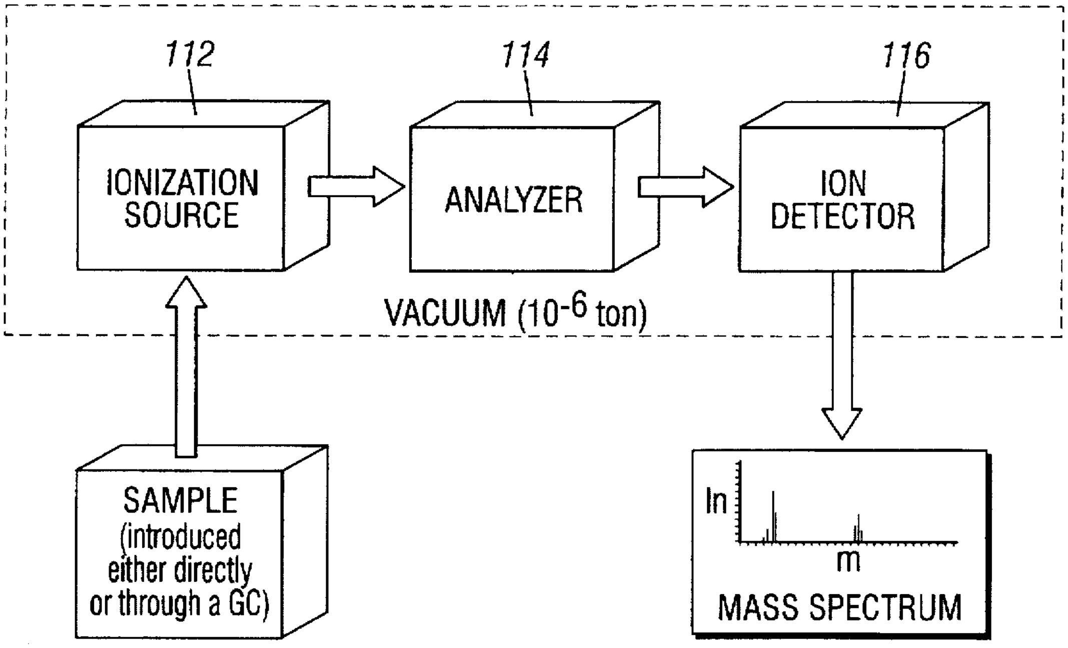
FIG. 1 shows a functional diagram of a mass spectrometer.
Figure 2:
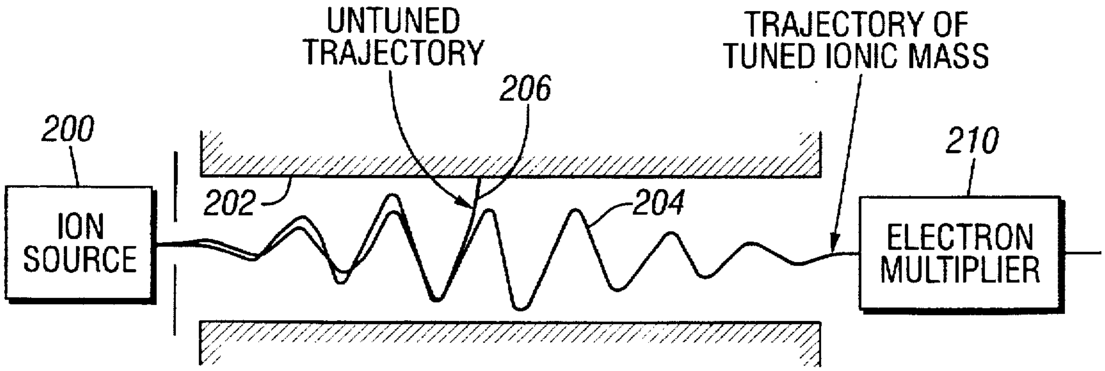
FIG. 2 shows a scanning type mass spectrometer.
Figure 3:
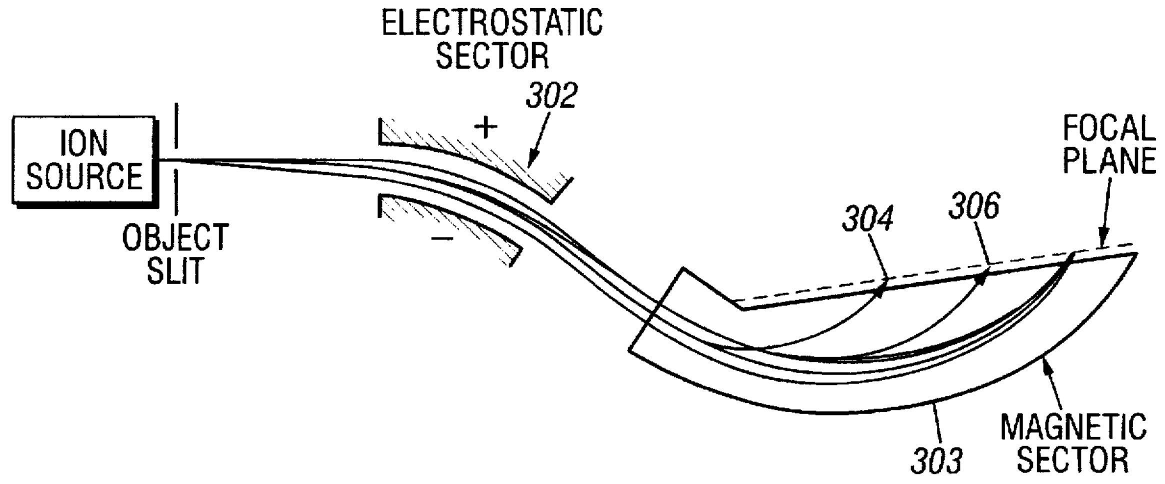
FIG. 3 shows a focal plane type mass spectrometer.
Figure 4:
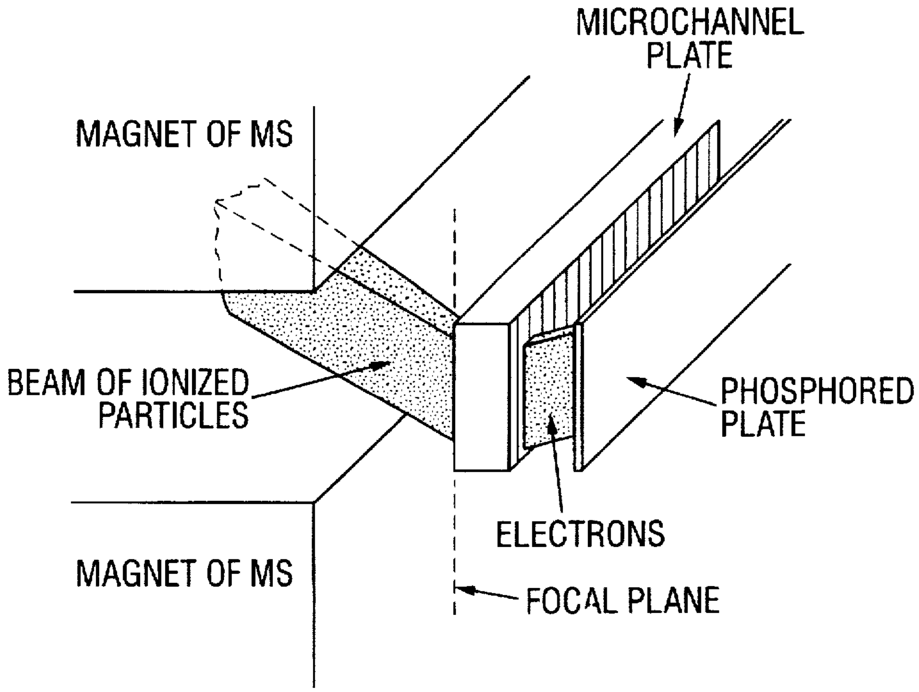
FIG. 4 shows a diagram of the detector device including the microchannel plate and the phosphor plate.
Figure 5:
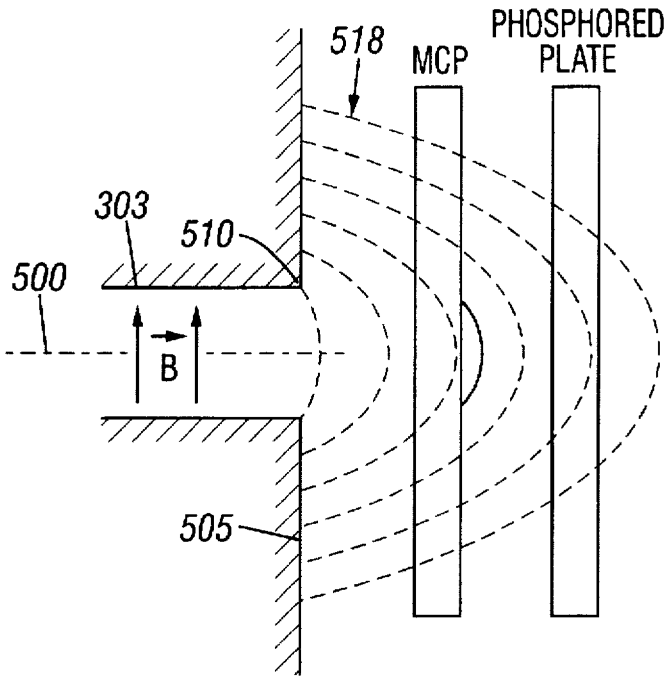
FIG. 5 shows a block diagram of a target including the microchannel plate and phosphor assembly and the uncompensated output area of the system.
Figure 6:
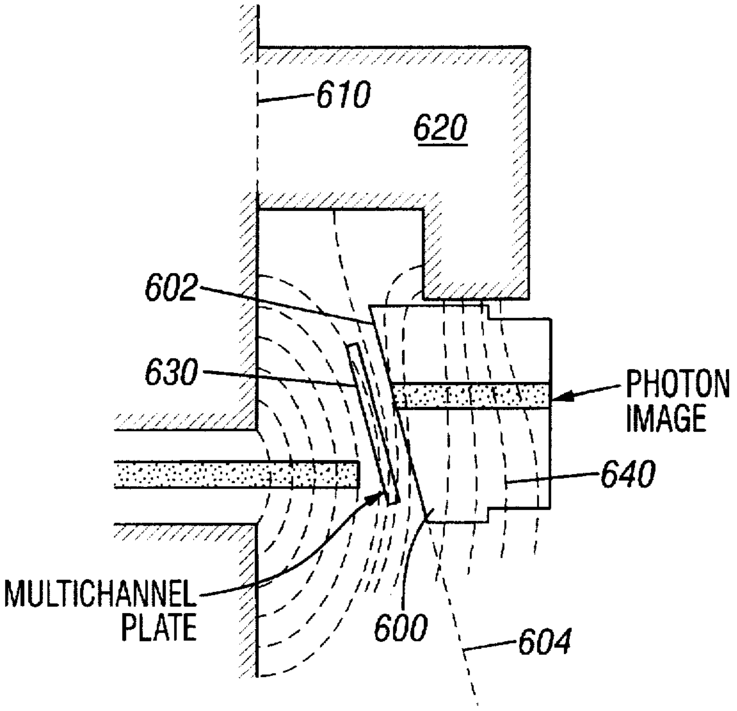
FIG. 6 shows the tilt of the detector and the change in magnetic flux direction by the addition of shims to the magnetic sector.
Figure 7:
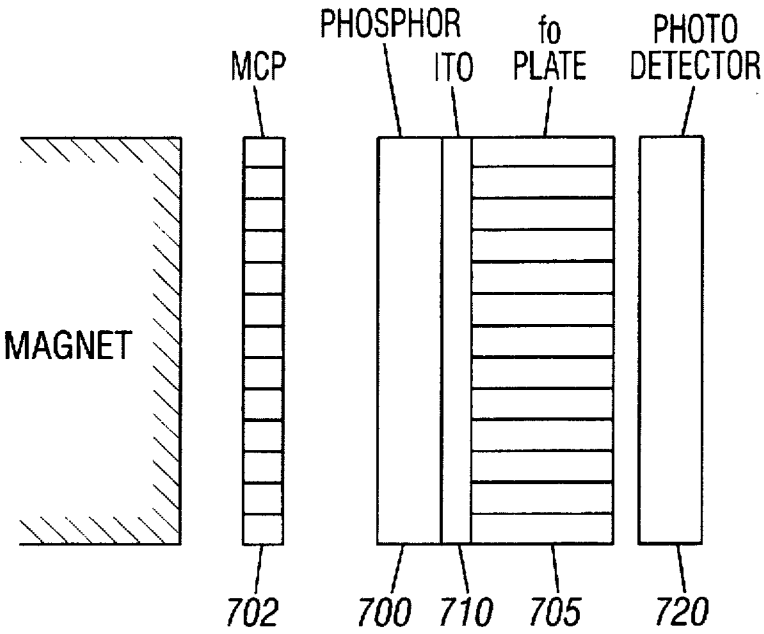
FIG. 7 shows a block diagram of a first embodiment of the present invention.

The inventor of the present invention investigated a number of options to avoid this problem. The resulting preferred first embodiment is shown in FIG. 7. The inventor found that a low energy excitation phosphor 700, such as ZnO:Zn or $Gd_2O_2S$:Tb could be used in a way which actually allowed bringing the phosphor plate closer to the particle source, e.g. the electron multiplier (MCP). The particle travelling area is hence made smaller. The preferred phosphor (ZnO:Zn) used according to this embodiment is conductive due to the O vacancies in the ZnO:Zn phosphor. The conductivity of phosphor enables these electrons to pass out of the Phosphor. Preferably, no aluminum or other conductive element layer is located between the source of particles to be detected, e.g the MCP 702, and the phosphor 700. The inventor realized that such a Phosphor could be formed without aluminum or other conducting layer being used between the MCP and the Phosphor.

According to the present invention, therefore, the electron multiplier device is placed close, e.g. 25 to 200 μm, more preferably 25 to 100 um, to a specially-configured phosphor display system. The phosphor display system includes a conductive phosphor 700 of approximately 1–3 μm in thickness, deposited over a fiber optic plate 705. An ITO layer 710 which is approximately an order of magnitude thinner than the phosphor, preferably 1000–3000 Å, even more preferably 2000 Å, is deposited under phosphor layer 700. More generally, however, this could be any conductive transparent element.

This conductive phosphor 700 forms the input surface to the imaging element, and is used without any additional metal conductive layer thereover. Since no conductive coating covers the phosphor, the electron energy can be decreased; here the electron energy is decreased to between 20 and 600 volts, preferably 200 volts. This decrease in energy is made possible by the inventor's recognition that the phosphor could be used without a conductive coating thereon, and therefore, the electrons do not have to penetrate through the conductive Al layer to strike the phosphor. The phosphor emits light which passes through the ITO layer 710, to the fiber optic plate 705, and to imaging array 720. Imaging array 720 can be a photodiode array, an active pixel sensor, a CCD or any other comparable element.

The conductive nature of the phosphor eliminates the local charging of the phosphor layer 700. However, the electrons impinging on the phosphor need to be provided with a path to ground to prevent these electrons from charging fiber-optic plate 705. The above electrical path to ground cannot be provided by directly connecting the phosphor layer to ground due to the soft, particle-nature of the phosphor. The problem was overcome in this new invention by depositing a thin conductive layer 710 of Indium-tin-oxide (ITO) on the fiber optic plate prior to the deposition of phosphor on the plate.

The optimum thickness of the ITO layer is about 50-ohms per square. A metal electrode was connected to the ITO layer on the fiber-optics plate. The electrode in this detector design is connected to ground. This can also be used to apply a positive potential for the acceleration of electrons exiting the channels of the MCP and before hitting the phosphor layer. ITO is conductive as well as transparent to visible light and therefore, allows the photons generated by the interaction of electrons and the phosphor to pass through the ITO layer and the optical fibers. The photon images of the electrons/ions are then measured with the photodetector array.

Accordingly, the system in the present invention uses a conductive phosphor element, preferably without a conductive coating thereon, placed close to the electron multiplier output. While the distance between the Phosphor and the MCP is preferably between 25 and 100 microns, more generally, this phosphor can be at any distance less than the inherent radius of curvature of the electron trajectory under the effect of the fringe magnetic field—and preferably at a distance less than one half of this radius.

Additional improvements are made by mixing the phosphor material with SnO and other similar materials.

The present invention of the array detector has a number of advantages over the previous state-of-the-art. No changes in the design of the magnetic sector is needed with the new detector. The magnetic sector of the mass spectrometer can be operated in its unmodified design. The new detector need not be tilted with respect to the focal plane. The detector is located along the focal plane and thus, preserves the true performance of the mass analyzer.

The new array detector is simpler in design. It is compact, rugged and reduces the cost of both the detector and the magnetic section of the mass spectrometer in comparison to the previous state-of-the-art detector.

SECOND EMBODIMENT:

A mass spectrometer measures ions. The actual particles whose intensities are being monitoring in a mass spectrometer system are hence ions. These ions, however, are multiplied by an electron multiplier device. The first embodiment described viewing the electrons that are generated by the ions—the ions are converted to electrons and electron-multiplied.

The present embodiment describes a system which allows direct excitation of luminescence from a phosphor by the traveling ions, not electrons, exiting the pole pieces of the magnetic sector.

Figure 8:
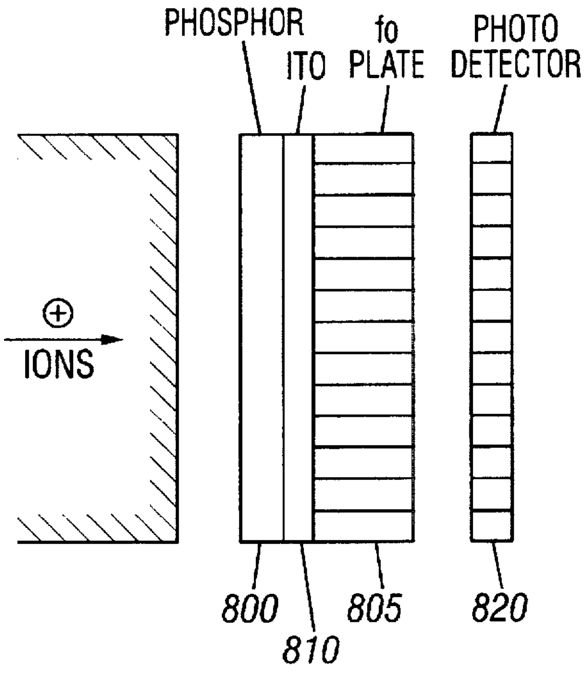
FIG. 8 shows a block diagram of the direct ion detector embodiment.

The energy of the ions exiting the focal plane of the magnet of a MS have never been sufficient to penetrate the conductive coating on the Phosphor Plate. According to this embodiment, the inventor uses a conductive Phosphor Plate coated on a Fiber optic Plate close to the magnet boundary, as in the first embodiment. The basic system is shown in FIG. 8. The ions impinge directly on this Phosphor Plate, and excite phosphorescence. The present inventors directly observed the images on the phosphor coated fiber-optic plate. This proves the concept that it is possible to detect these ions when they impinge directly the Phosphor Plate.

This system must be properly calibrated for different ion masses, and efficiency issues. However, the benefits from this system are great. The MCP has always required high voltage of 1–3 kV and low pressure ($<10^{-5}$ torr) inside and outside the microchannels.

The direct excitation of phosphor by ions (without their conversion to electrons with a MCP) permits the operation of the mass spectrometer at a higher pressure ($\sim 10^{-4}$ torr). A small pump can be used to maintain such a pressure. The detection scheme allows further miniaturization of the detector and the pumping system with attendant reduction in power and mass of the instrument (MS or GC-MS).

Calibration of this system for different sizes of ions, prevention of etching and efficiency issues are necessary. However, all of these problems can be appropriately compensated. According to this aspect of the invention the primary ions are directly applied to a special kind of Phosphor that is conductive and formed without an MCP or an aluminum layer on the phosphor. These ions are perceived directly without conversion to electrons.

Since the present invention allows direct viewing of different particles, electrons, and ions, the term particle as used herein is intended to be generic to both electrons and ions, as well as any other particle of the type which can be viewed in this way.

Although only a few embodiments have been described in detail above, those having ordinary skill in the art will certainly understand that many modifications are possible in the preferred embodiment without departing from the teachings thereof. For example, while this invention has been described as a GCMS system, more generally, it could be used with any particle manipulator which changes some aspect of particle trajectory based on a specified criterion. Examples include cathode ray tubes and ion etching devices.

All such modifications are intended to be encompassed within the following claims.

What is claimed is:

1. A focal plane type ion imaging system which images ions that are indicative of a material to be imaged, said ions having masses, said system comprising:

an ion separator which separates ions according to their masses, and produces output ions at an exit area thereof, the ions exiting in a first direction;

a microchannel plate which produces electrons having a characteristic indicative of an amplified ion intensity, the microchannel plate having channels which amplify the ion intensity and output the electrons indicating an amplified intensity, and wherein a direction of the channels is substantially parallel to the first direction, wherein an entrance of the microchannel plate is located under an influence of a fringe field of said particle separator; and a phosphor plate located to receive electrons that are output from the microchannel plate, said phosphor plate being substantially parallel to the first direction.

2. A system as in claim 1, wherein said microchannel plate has an input area which is substantially parallel to an output plane of the particle separator.

3. A particle imaging system responsive to a particle source producing particles that is indicative of a material to be imaged, comprising:

an ion separator which separates ions according to a mass thereof, and produces output ions at an exit area thereof, said ions traveling in a first direction when exiting said exit area, an ion amplifier, receiving input ions, and producing electrons indicative of said input ions, to produce output electrons traveling under the influence of a fringe field which bends the electrons to have a radius of curvature R of a particle trajectory which is defined by the equation $$R=\frac{K}{B}\sqrt{M_eV_e}$$

where B is a magnitude of the fringe magnetic field, $M_e$ is the mass of the electron and $V_e$ is the energy (volts) of the electron; and an imaging element, having an input surface, operating to image the electrons, said input surface separated from the exit area by a separation which is less than R.

4. A system as in claim 3, wherein said imaging element includes a phosphor plate.

5. A system as in claim 4 wherein said phosphor plate has an electron entry surface which is free from conductive material thereon.

6. A system as in claim 4 wherein said first direction is perpendicular to said input surface of said exit area and faces a plate which is not tilted relative to the exit area.

7. A system as in claim 3, wherein said imaging element comprises a photodetector element.

8. A system as in claim 7, wherein said photodetector element is a CCD, a photodiode, or an active pixel sensor array.

9. A particle imaging system, comprising:

an ion source, producing an ion that is indicative of a material to be imaged;

an ion separator, having a magnetic field therein, and a fringe field outside, said ion separator separating ions according to a mass thereof, and producing output particles at an exit area thereof, said ions having an initial direction, and traveling under influence of a fringe field from the magnetic field;

an ion converter, converting said ions to electrons, an electron traveling area in which said electrons travel under influence of the fringe field, the electron traveling area being under the magnetic influence from the fringe field only, and not from any other additional magnetic extension;

an imaging system, operating to image the electrons, said imaging system including a first surface which faces the ion converter and the electron traveling area, and said imaging system including a phosphor plate with a surface facing said exit area, said phosphor plate having a first surface which is free of metal material thereon and producing an image of the electrons which is detected to determine information about the ions; and wherein a separation between the particle output and the first surface is constrained to be less than a radius of the particle under influence of the fringe field, and wherein said first surface is substantially perpendicular to a direction of said initial direction.

10. A system as in claim 9, wherein said electrons are particles and wherein an electron energy is decreased to a level between 20 and 600 volts.

11. A system as in claim 9 wherein said ion converter includes an electron multiplier device within said particle traveling area.

12. A system as in claim 11, wherein said electron multiplier device has an input surface which is substantially parallel with said first surface.

13. A system as in claim 9 wherein said particle separator comprises an electron multiplier device within said particle travelling area.

14. A system as in claim 9, wherein said phosphor is formed of a material that is excitable by low energy electrons.

15. A particle imaging system, comprising:

a particle source, producing a particle that is indicative of a material to be imaged;

a particle separator, having a magnetic field therein, and a fringe field outside, said particle separator separating particles according to a mass thereof, and producing output particles at an exit area thereof, said particles having an initial direction, and traveling under influence of a fringe field from the magnetic field;

a particle traveling area, adjacent said exit area, and in which said particles travel under influence of the fringe field, the particle traveling area being under the magnetic influence from the fringe field only, and not from any other additional magnetic extension;

an imaging system, operating to image the particle, said imaging system including a first surface which faces the exit area and the particle traveling area, and said imaging system including a phosphor plate with a surface facing said exit area, said plate having a first surface which is free of metal material thereon;

wherein a separation between the particle output and the first surface is constrained to be less than a radius of the particle under influence of the fringe field, and wherein said first surface is substantially perpendicular to a direction of said initial direction; and wherein said phosphor is formed of one of ZnO:Zn or $Gd_2O_2S$:Tb.

16. A particle imaging system, comprising:

a particle source, producing a particle that is indicative of a material to be imaged;

a particle separator, having a magnetic field therein, and a fringe field outside, said particle separator separating particles according to a mass thereof, and producing output particles at an exit area thereof, said particles having an initial direction, and traveling under influence of a fringe field from the magnetic field;

a particle traveling area, adjacent said exit area, and in which said particles travel under influence of the fringe field, the particle traveling area being under the magnetic influence from the fringe field only, and not from any other additional magnetic extension;

an imaging system, operating to image the particle, said imaging system including a first surface which faces the exit area and the particle traveling area, and said imaging system including a phosphor plate with a surface facing said exit area, said plate having a first surface which is free of metal material thereon;

wherein a separation between the particle output and the first surface is constrained to be less than a radius of the particle under influence of the fringe field, and wherein said first surface is substantially perpendicular to a direction of said initial direction; and an electron multiplier device which is between 25 to 200 μm away from the phosphor plate.

17. A particle imaging system, comprising:

a particle source, producing a particle that is indicative of a material to be imaged;

a particle separator, having a magnetic field therein, and a fringe field outside, said particle separator separating particles according to a mass thereof, and producing output particles at an exit area thereof, said particles having an initial direction, and traveling under influence of a fringe field from the magnetic field;

a particle traveling area, adjacent said exit area, and in which said particles travel under influence of the fringe field, the particle traveling area being under the magnetic influence from the fringe field only, and not from any other additional magnetic extension;

an imaging system, operating to image the particle, said imaging system including a first surface which faces the exit area and the particle traveling area, and said imaging system including a phosphor plate with a surface facing said exit area, said plate having a first surface which is free of metal material thereon;

wherein a separation between the particle output and the first surface is constrained to be less than a radius of the particle under influence of the fringe field, and wherein said first surface is substantially perpendicular to a direction of said initial direction; and wherein said phosphor plate includes a fiber optic plate, a conductive layer of Indium-tin-oxide (ITO) on the fiber optic plate, and a layer of phosphor on the ITO, the layer of phosphor being an order of magnitude thicker than the ITO.

18. A system as in claim 14, wherein the ITO layer is of a thickness to yield substantially 50-ohms per square.

19. A focal plane type ion imaging system; comprising:

a particle separator which separates ions according to their masses, and produces output ions, converts the output ions to electrons, and outputs electrons at an exit area thereof, the electrons exiting in a first direction under influence of a fringe field produced by said particle separator; and a phosphor plate, adjacent said exit area to receive the electrons therefrom and produces an optical output indicative of the electrons which are received, said phosphor plate having an input surface which receives the electrons which is free from conductive metal thereon; and a photosensor, sensing the optical output from said phosphor plate.

20. A system as in claim 19, wherein said particles are electrons, further comprising a microchannel plate which amplifies particle intensity, the microchannel plate having channels which amplify the particle intensity, and wherein a direction of the channels is substantially parallel to the first direction.

21. An imaging phosphor plate comprising:

a first surface adapted to receive particles to be imaged at a first face thereof, said first surface including a substantially flat surface of conductive phosphor, with no conductive metal material on said first surface, and having a second face, opposite said first surface;

a second surface of a conductive light transmitting material, underlying said second face of said first surface; and a third surface, formed of fiber optic channels, said fiber optic channels extending from a first face of said third surface to a second face of said third surface, said first face facing said second surface.

22. A plate as in claim 21, wherein said first surface is 1–3 μm thick, and said second surface is 1000–2000 Å thick.

23. A particle imaging system, comprising:

a particle manipulator, which changes some aspect of particle trajectory, based on a specified criterion, and produces output particles at an exit area thereof, the particles exiting in a first direction; and a phosphor plate, adjacent said exit area to receive the particles therefrom, said phosphor plate having an input surface which is free from conductive metal thereon, said phosphor plate having a first layer adapted to receive particles to be imaged at a first face thereof, said first layer including a substantially flat layer of conductive phosphor, with no conductive metal material on said first layer, and having a second face, opposite said first layer;

a second layer of a conductive light transmitting material, underlying said second face of said first layer; and a third layer, formed of fiber optic channels, said fiber optic channels extending from a first face of said third layer to a second face of said third layer, said first face facing said second layer.

24. A system as in claim 23, wherein said particles are electrons.

25. A system as in claim 23, wherein said particles are ions.

26. A method of obtaining an image of ions, comprising forming a conductive phosphor element, without a conductive coating on a facing surface thereof, said facing surface being located in a path of ions; and directly exciting luminescence of the phosphor by the traveling ions.

27. A method as in claim 26, further comprising observing the luminescence with a light observing element.

28. A method of determining characteristics of ions, comprising:

using a magnetic field to separate ions according to their masses to produce separated output ions at an exit area thereof, the ions exiting in a first direction;

converting the ions to electrons;

allowing the electrons to travel under influence of a fringe of the magnetic field; and situating a viewing element to receive the electrons, the viewing element being situated perpendicular to the first direction.

29. A method as in claim 28, wherein the particles traveling under the influence of the fringe, which bends the particles to have a radius of curvature R of a particle trajectory which is defined by the equation $$R=\frac{K}{B}\sqrt{MV}$$

where B is a magnitude of the fringe magnetic field, M is the mass of the particle and V is the energy (volts) of the particle; and wherein said viewing element is situated to have an imaging element, having an input surface, operating to image the particles, said input surface seperated from the exit area by a separation which is less than R.

* * * * *

UNITED STATES PATENT AND TRADEMARK OFFICE
CERTIFICATE OF CORRECTION

PATENT NO. : 5,801,380
DATED : SEPTEMBER 1, 1998
INVENTOR(S) : MAHADEVA P. SINHA

It is certified that error appears in the above-identified patent and that said Letters Patent is hereby corrected as shown below:

Column 1; after the title, please insert;

-- STATEMENT AS TO FEDERALLY SPONSORED RESEARCH

Applicants herewith notify the Patent Office that the above-referenced application may have received funding under U.S. Government Grant No. NAS 7-1407 awarded by NASA.--.

Signed and Sealed this

Sixth Day of March, 2001

Attest:

*Nicholas P. Godici*

NICHOLAS P. GODICI

*Attesting Officer* *Acting Director of the United States Patent and Trademark Office*